United States Patent [19]

Moss

[11] 4,184,632

[45] Jan. 22, 1980

[54] DATA CARD AND DATA CARD READER COMBINATION

[76] Inventor: Mark W. Moss, P.O. Box 17024, Irvine, Calif. 92713

[21] Appl. No.: 928,803

[22] Filed: Jul. 28, 1978

[51] Int. Cl.$^2$ .................. G06K 7/14; G06K 19/06; G08C 9/06
[52] U.S. Cl. .................................. 235/458; 235/489; 250/555
[58] Field of Search ............... 235/462, 466, 482, 487, 235/449, 458; 360/2; 250/569, 555

[56] References Cited

U.S. PATENT DOCUMENTS

| | | | |
|---|---|---|---|
| 3,211,470 | 10/1965 | Wilson | 235/487 |
| 3,445,635 | 5/1969 | Trickett et al. | 235/462 |
| 3,573,731 | 4/1971 | Schwend | 235/482 |
| 3,673,389 | 6/1972 | Kapsambelis et al. | 235/466 |
| 4,010,355 | 3/1977 | Roehrman et al. | 235/462 |

Primary Examiner—Daryl W. Cook
Attorney, Agent, or Firm—Lyle J. Schlyer

[57] ABSTRACT

A data card and data card reader combination including a data card incorporating two data tracks consisting of a plurality of perforations spatially arranged to represent encoded data. A card reader incorporates at least one radiant energy source, two radiant energy detectors, and guide means for guiding the movement of the data tracks between the radiant energy source and the radiant energy detectors whereby a first data pulse train and a second data pulse train corresponding to the perforations of said data tracks may be produced. An "OR" circuit receives the first data pulse train producing a clock pulse train, which in turn is fed to a holding shift register. A selector circuit selects the data pulse train exhibiting the first appearing pulse and in turn feeds the selected data pulse train to the holding shift register.

7 Claims, 5 Drawing Figures

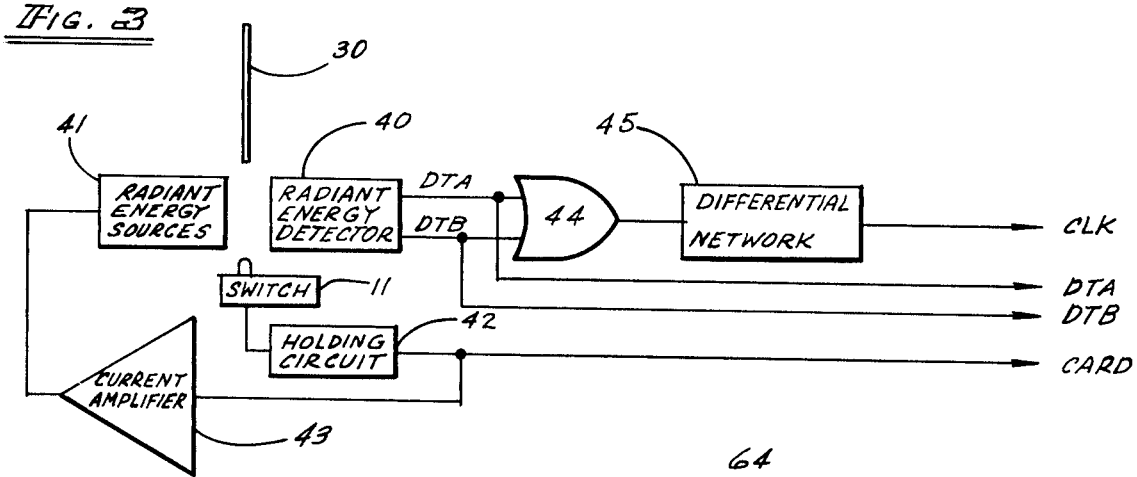
FIG. 3
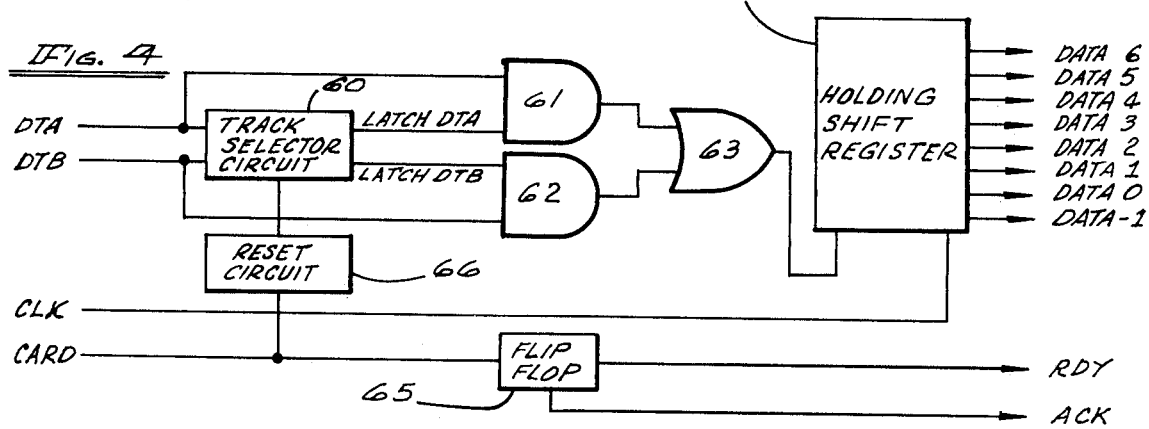
FIG. 4
FIG. 5
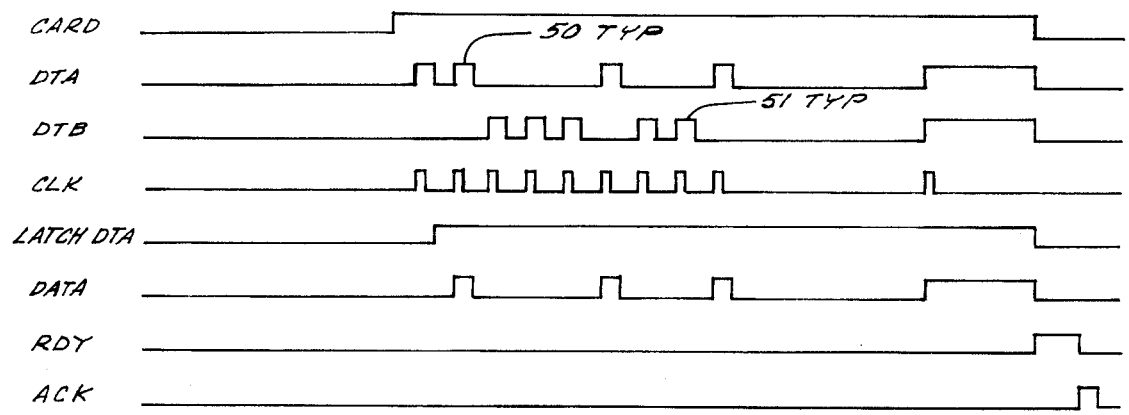

DATA CARD AND DATA CARD READER COMBINATION

BACKGROUND OF THE INVENTION

1. Field of the Invention

This invention relates generally to the field of radiant energy responsive record controlled registers and specifically to data encoded cards in combination with such record controlled registers or card readers.

2. Description of the Prior Art

With a growing need for a minimum level of security in business offices, government agencies, residential developments, and manufacturing locations, coupled with a continuing need for specifically recording the ingress and egress of authorized individuals, there is a growing need for an inexpensive and reliable identification card reader. A data card reader exhibiting these features would find many alternative applications, as well, as the desirability of data processing continues to grow. Various prior art devices are known which solve this need but, in general, such devices are expensive to produce, unreliable to use or inconvenient to encode.

The extracting of data magnetically encoded upon a card is well known. However, complicated logic circuits capable of decoding such information result in installation costs far beyond the reach of many potential users. Mechanical and pneumatic punch card readers which detect the presence or absence of perforations in a data card introduce a degree of unreliability which is obviously undesirable. Radiant energy responsive readers are also known which detect the presence or absence of such perforations or voids. However, again such devices are generally expensive. One reason for the expense is the need to provide complicated logic and/or mechanics adapted to sequentially time the extraction of data such that it may be properly decoded.

All such prior art devices suffer another common problem in that the data encoded card must be specifically aligned with respect to the reading element or head. Improper insertion of the card into the reader results in an improper reading. As a result, prior art devices typically require a user to insert the card into the reader in the proper orientation as designated by a "top" or "bottom" legend imprinted upon the card.

SUMMARY OF THE INVENTION

In order to provide an improved identification card and card reader combination which is inexpensive to produce, eliminates the need to independently time the extracted data, allows encoding by the user, and allows accurate reading when the card is inserted in either of two possible orientations, the applicant proposes an identification card incorporating at least two parallel data tracks at one end thereof and a clip at the other end thereof, the data tracks consisting of a plurality of punched holes. The card reader incorporates a radiant energy detector producing a data pulse train corresponding to each data track of the card as the card is removed from the card reader. Clock means are provided by combining the data pulse trains to produce a one shot clock pulse train used to time the storage of data in a serial-to-parallel shift register. Selector means are provided for selecting the data pulse train containing the first occuring data pulse and feeding all successive data pulses of the selected data pulse train to the shift register, whereby the data pulses in the selected data pulse train will be stored as a binary "one" and the pulses of the unselected data pulse train will be stored as a binary "zero".

BRIEF DESCRIPTION OF THE DRAWINGS

The invention will be more fully appreciated from the following detailed description of the preferred embodiment thereof taken in conjunction with the appended drawings wherein:

FIG. 3 is a block diagram showing schematically the operation of the data and clock pulse train generating portion of the card reader;

FIG. 4 shows schematically the operation of the interface logic portion of the card reader; and FIG. 5 is a timing diagram showing the output of the pulse train generator and the signals within the interface logic.

DETAILED DESCRIPTION OF THE DRAWINGS

Figure 1:
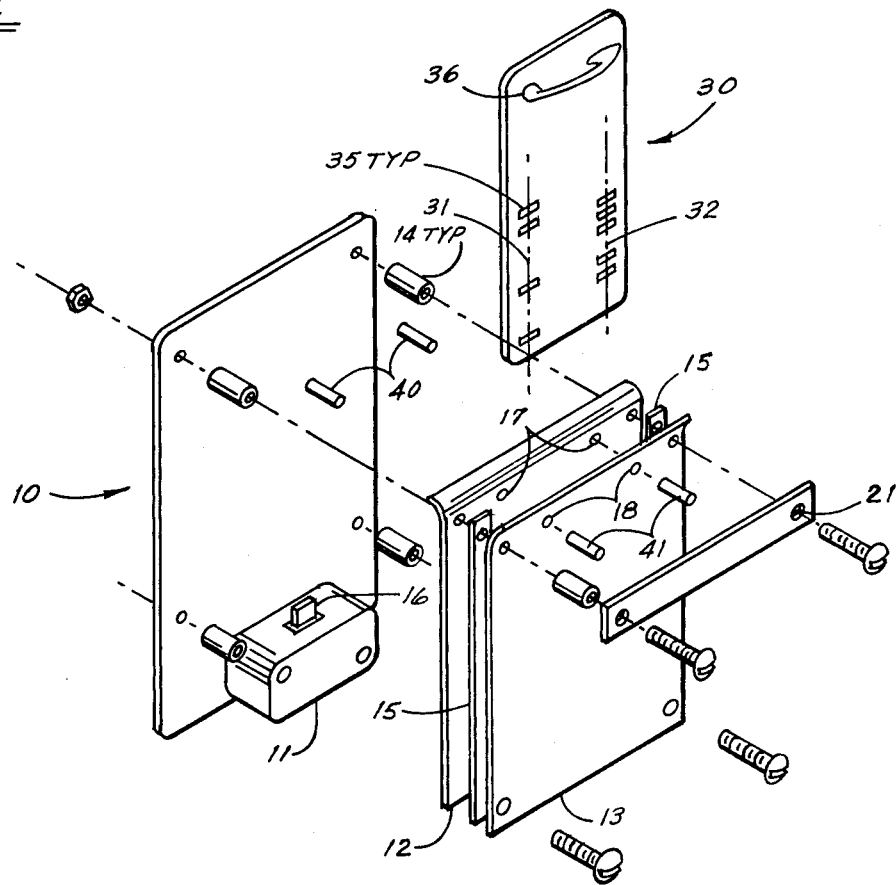
FIG. 1 is a perspective view showing the assembly of a card reader and data card embodying the invention.

As shown in FIG. 1, the card reader of this invention includes a circuit board 10 upon which a switch 11 and various other electrical components, unshown in the drawing, may be mounted. Also mounted upon the circuit board 10 are inner and outer card guides 12 and 13 respectively, spatially separated from the circuit board 10 by cylindrical spacers 14 and separated from each other by parallel spacer bars 15. The thickness of and the distance between the spacer bars 15 is chosen to approximate and slightly exceed the thickness and width of a data encoded card 30 to be read. The length of the cylindrical spacers 14 is chosen such that the card 30, when inserted between the card guides 12 and 13, will be aligned in the same plane with an actuating plunger 16 of the switch 11.

Each card guide 12 and 13 incorporates a pair of opposed bores 17 and 18, each bore located adjacent to one of the spacer bars 15 at the ends of the card guides 12 and 13 opposite the switch 11. The bores of each pair 17 and 18 are separated by a distance corresponding to the distance between two parallel data tracks 31 and 32 carried by the card 30 as shown in the drawing by vertical center lines. The data tracks 31 and 32 consist of a plurality of perforations 35 passing through the card 30, encoded to carry data as will be more fully described in conjunction with the discussion of FIG. 2 below.

Residing within the bores 17 of the inner card guide 12 and mounted upon the circuit board 10 are shown two radiant energy responsive detectors 40, preferably photo sensitive transistors. Residing within the bores 18 of the outer card guide 13 and mounted upon a mounting bar 21 are shown two radiant energy sources 41, preferably light emitting diodes.

In operation, the data encoded card 30 is inserted between the card guides 12 and 13 until the leading edge of the card 30 contacts and depresses the plunger 16, actuating the switch 11, which in turn energizes the radiant energy sources 41. As the card 30 is withdrawn from the card guides 12 and 13, the radiant energy detectors 40 are selectively activated by each perforation 35 of the two data tracks 31 and 32. As more fully described in conjunction with the discussion of FIGS. 3 and 4, the card 30 may be rotated 180° about its vertical axis prior to insertion without affecting the decoding of the data. A clip 36 mounted upon the card 30 adjacent the end thereof opposite the data tracks 31 and 32 prevents the insertion of the card 30 into the reader if rotated 180° about its horizontal axis. The clip 36 is designed to allow the card 30 to be conveniently attached to the clothing of a user such that the card may also serve as a name tag.

Figure 2:
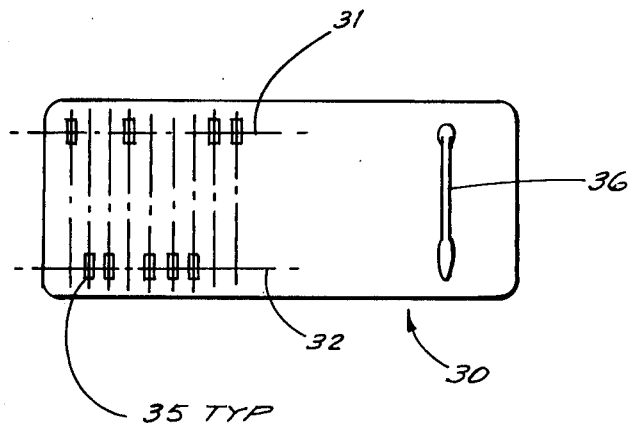
FIG. 2 is a plan view of the data encoded card.

Now referring to FIG. 2, the details of the encoding of the data card 30 may be shown. In this view, horizontal center lines denote the location of the two data tracks 31 and 32. In addition, vertical center lines are shown which indicate potential sites for data perforations 35. While the data perforations 35 shown are illustrative only and may obviously be rearranged to correspond to various coding schemes, the following encoding constraints are essential to proper operation of this invention:

1. Only one data perforation 35 may reside on each horizontal data site center line; and
2. The perforation 35 nearest the end of the card 30 incorporating the clip 36 must reside in the data track 31 or 32 which is intended to be read as a binary code "one". The remaining data track 31 or 32 will be read as binary "zeroes".

Referring now to FIGS. 3 and 4, described in conjunction with FIG. 5, the details of the operation of the card reader of this invention and the need for the above encoding constraints may be shown. As previously described, the insertion of the card 30 actuates the switch 11 which energizes the radiant energy sources 41. As shown in FIG. 3, a holding circuit 42 is used to energize the energy sources 41 for a sufficient period of time to allow removal and reading of the card 30. A current amplifier 43 may be used to supply sufficient power to the radiant energy sources 41 without requiring high circuit voltages generally.

The radiant energy detector 40 outputs (indicated in FIGS. 3 and 5 as DTA and DTB) are two data pulse trains generated by the data tracks 31 and 32 of the card 30. The individual data pulses 50 and 51 of the data pulse trains DTA and DTB have a period equal to the length of exposure of the radiant energy detectors 40 and, as a result of the horizontal misalignment of the perforations 35 as discussed above, the individual data pulses 50 and 51 do not overlap. The data pulse trains DTA and DTB, in addition to providing input for an interface portion of the card reader as shown in FIG. 4, combine in an "OR" circuit 44 which inputs to a differential network 45 whereby the period of each pulse 50 and 51 is shortened, providing a one shot clock pulse train, designated as CLK.

Referring specifically to FIG. 4, the data pulse trains DTA and DTB are shown as inputs to a track selector circuit 60 which provides a latching signal for the data pulse train DTA or DTB exhibiting the first occuring pulse. The DTA latching signal and DTA pulse train are combined in an "AND" circuit 61 and the DTB latching and DTB pulse train are similarly combined in an "AND" circuit 62. The respective outputs are next fed to a subsequent "OR" circuit 63 such that only the data pulses in the pulse train containing the pulse which is first in time will be fed to a shift register 64. This is illustrated in the timing diagram of FIG. 5 wherein the trailing edge of the first occuring pulse, in this case occuring in the DTA pulse train, produces a track latch such that all subsequent pulses in the DTA pulse train will become data input (DATA). As shown in FIG. 4, the clock pulse train CLK is also fed to the shift register 64. The shift register 64 functions as a serial to parallel converter by triggering the retention of data as the trailing edge of each clock pulse is encountered. If, at that time, the data input (DATA) is energized (i.e., a pulse is encountered), the shift register 64 stores the data as a binary code "1". If the data input (DATA) is not energized, the shift register 64 stores a binary "0". As may be seen, the clock pulses are by design of shorter duration than the data pulses in order to minimize erroneous readings.

The output of the holding circuit 42, designated as CARD in the drawings, is fed to a flip-flop circuit 65 which produces a ready pulse (RDY) upon encountering the trailing edge of the holding circuit (CARD). The ready pulse (RDY) may be used to trigger a read circuit in a computer or other electronic host, unshown, which then returns an acknowledge signal (ACK), upon assimilation of the stored data, terminating the ready pulse (RDY). The holding circuit pulse (CARD) also operates a reset circuit 66 for resetting the track latch circuit 60 thereby allowing a subsequent data card 30 to be read.

It is understood that the embodiment described above is merely an example of the application of the principles of this invention. Additional embodiments may be devised by those skilled in the art without departing from the spirit or scope of the invention.

I claim:

1. A data card and data card reader combination comprising:
    a. a data card incorporating two data tracks, said data tracks surrounding a plurality of perforations spatially arranged to represent encoded data;
    b. at least one radiant energy source;
    c. two radiant energy detectors;
    d. guide means for guiding the movement of said data card with respect to said radiant energy detectors whereby said detectors may produce two data pulse trains corresponding to the perforations of said data tracks; and
    e. selector means for assigning a first binary code value to the data pulse train exhibiting the first appearing pulse and a second binary code value to the data pulse train not exhibiting the first appearing pulse.

2. A data card and data card reader combination comprising:
    a. a data card incorporating a first data track and a second data track, said data tracks surrounding a plurality of perforations spatially arranged to represent encoded data;
    b. at least one radiant energy source;
    c. a first radiant energy detector and a second radiant energy detector;
    d. guide means for guiding the movement of said data card with respect to said radiant energy detectors whereby said first radiant energy detector may produce a first data pulse train and said second radiant energy detector may produce a second data pulse train, each said data pulse train corresponding to the perforations of said data tracks;
    e. clock generating means for combining said first data pulse train and said second data pulse train whereby a clock pulse train may be produced;
    f. a serial to parallel converter receiving said clock pulse train and said first data pulse train whereby the coincidence of said clock pulse train and said first data pulse train may be stored as a first binary code value and all other pulses of said clock may be stored as a second binary code value.

3. The combination of claim 2 wherein said clock generating means comprises:
   a. an "OR" circuit receiving as input said first data pulse train and said second data pulse train;
   b. a differential network receiving the output of said "OR" circuit, said differential network producing a one shot pulse coincidental with each data pulse whereby a clock pulse train may be produced.

4. The combination of claim 1 or claim 3 wherein said guide means comprises:
   a. two parallel plates spatially separated by a distance approximating and exceeding the thickness of said data card;
   b. two parallel guide bars cooperating with opposed edges of said plates, said guide bars being spatially separated by a distance approximating and exceeding the width of said data card;
   c. a switch controlling said radiant energy source residing in the planar surface formed by said parallel plates and further residing at one end of said guide bars, whereby maximum insertion of said data card between said plates and guide bars operates said switch thereby actuating said radiant energy source.

5. The combination of claim 4 wherein said data card comprises:
   a. a planar surface of rectangular dimensions, said two data tracks each residing adjacent to and parallel with an opposed longer edge of said planar surface, said data tracks beginning adjacent to and running from one end of said planar surface; and
   b. an insertion limiting means cooperating with and attached to the end of said planar surface opposite said data tracks, whereby only the end of said data card opposite said insertion limiting means may be inserted between the parallel guide plates.

6. The combination of claim 5 wherein said insertion limiting means comprises a clip.

7. The combination of claim 2 wherein said clock generating means comprises:
   a. a first differential network receiving the first date pulse train, producing a one shot pulse coincidental with each data pulse therein;
   b. a second differential network receiving the second data pulse train, producing a one shot pulse coincidental with each data pulse therein; and
   c. an "OR" circuit receiving as input said differentiated first data pulse train and said differentiated second data pulse train whereby a clock pulse train may be produced.

\* \* \* \* \*